(12) United States Patent
Xu et al.

(10) Patent No.: US 10,243,644 B2
(45) Date of Patent: Mar. 26, 2019

(54) METHOD ENABLING AN RN TO SUPPORT MULTIPLE WIRELESS ACCESS SYSTEMS

(71) Applicant: Samsung Electronics Co., Ltd., Gyeonggi-do (KR)

(72) Inventors: Lixiang Xu, Beijing (CN); Hong Wang, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 14/433,371

(22) PCT Filed: Jul. 25, 2013

(86) PCT No.: PCT/KR2013/006688
§ 371 (c)(1),
(2) Date: Apr. 2, 2015

(87) PCT Pub. No.: WO2014/021581
PCT Pub. Date: Feb. 6, 2014

(65) Prior Publication Data
US 2015/0264725 A1    Sep. 17, 2015

(30) Foreign Application Priority Data

Aug. 3, 2012   (CN) .......................... 2012 1 0276182

(51) Int. Cl.
*H04B 7/14*          (2006.01)
*H04W 24/02*         (2009.01)
(Continued)

(52) U.S. Cl.
CPC .............. *H04B 7/14* (2013.01); *H04W 24/02* (2013.01); *H04W 36/0072* (2013.01);
(Continued)

(58) Field of Classification Search
CPC .............. H04W 76/021; H04W 24/02; H04W 36/0042; H04W 72/0413; H04W 72/042; H04W 76/046; H04W 88/10; H04B 7/14
See application file for complete search history.

(56) References Cited

U.S. PATENT DOCUMENTS 8,855,138 B2    10/2014  Horn et al.
2010/0046418 A1  2/2010  Horn et al.
(Continued)

FOREIGN PATENT DOCUMENTS

| CN | 101594572 A | 12/2009 |
| CN | 101730032 A | 6/2010 |
| CN | 102348255 A | 2/2012 |

OTHER PUBLICATIONS

International Search Report dated Nov. 21, 2014 in connection with International Application No. PCT/KR2013/006688; 3 pages.
(Continued)

*Primary Examiner* — Lonnie V Sweet

(57) ABSTRACT

A method enabling an relay node (RN) to support multiple wireless access techniques is provided, which includes: a mobility management element (MME) requests a DeNB to establish evolved radio access bearers (ERAB) of EUTRAN and indicates access network information that will be transmitted by each of the ERABs; the DeNB requests an RN to establish radio bearers (RB) and indicates the access network information that will be transmitted by each of the RBs. The above method makes fewer modifications to conventional networks and techniques, guarantees service quality provided for a UE accessing an LTE system, and enables an RN to support access of UEs using multiple access techniques.

19 Claims, 9 Drawing Sheets

(51) Int. Cl.
  *H04W 36/00*  (2009.01)
  *H04W 72/04*  (2009.01)
  *H04W 76/11*  (2018.01)
  *H04W 76/27*  (2018.01)
  *H04W 88/10*  (2009.01)

(52) U.S. Cl.
  CPC ..... *H04W 72/042* (2013.01); *H04W 72/0413* (2013.01); *H04W 76/11* (2018.02); *H04W 76/27* (2018.02); *H04W 88/10* (2013.01)

(56) References Cited

U.S. PATENT DOCUMENTS

| | | | | |
|---|---|---|---|---|
| 2010/0202351 | A1* | 8/2010 | Xi | H04L 29/12188 370/328 |
| 2010/0246533 | A1* | 9/2010 | Lundin | H04W 36/0066 370/332 |
| 2010/0260096 | A1* | 10/2010 | Ulupinar | H04B 7/2606 370/315 |
| 2011/0145319 | A1* | 6/2011 | Dolan | H04L 47/72 709/203 |
| 2011/0235569 | A1 | 9/2011 | Huang et al. | |
| 2011/0261747 | A1 | 10/2011 | Wang et al. | |
| 2012/0039240 | A1 | 2/2012 | Han et al. | |
| 2013/0094435 | A1 | 4/2013 | Deng et al. | |

OTHER PUBLICATIONS

Written Opinion of International Searching Authority dated Nov. 21, 2014 in connection with International Application No. PCT/KR2013/006688; 5 pages.

Office Action dated Nov. 3, 2017 in connection with Chinese Patent Application No. 201210276182.6.

* cited by examiner

[Fig. 1]
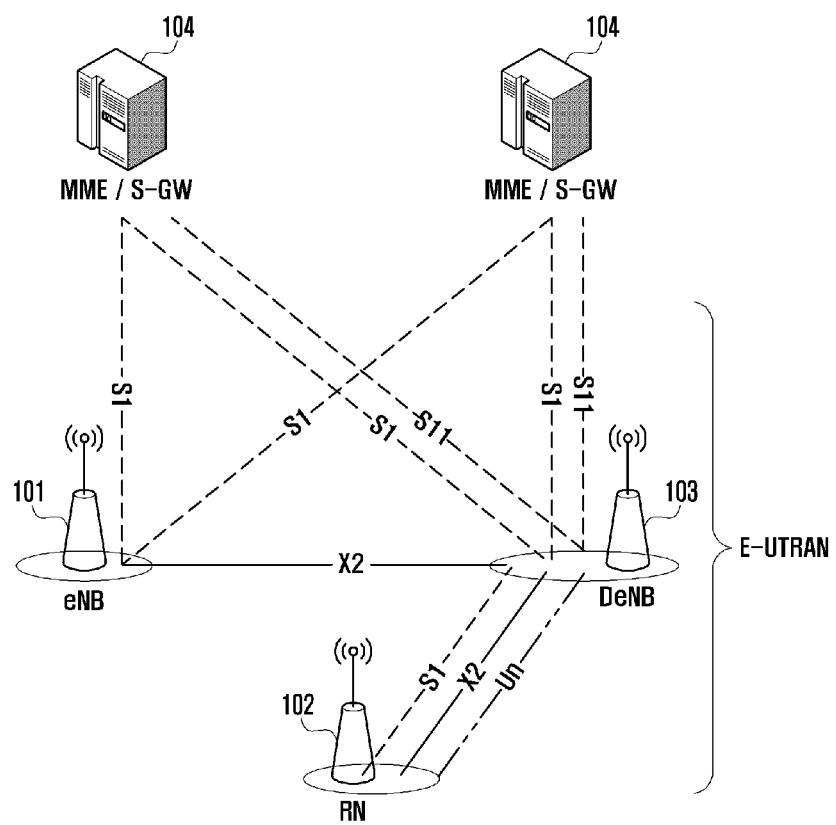

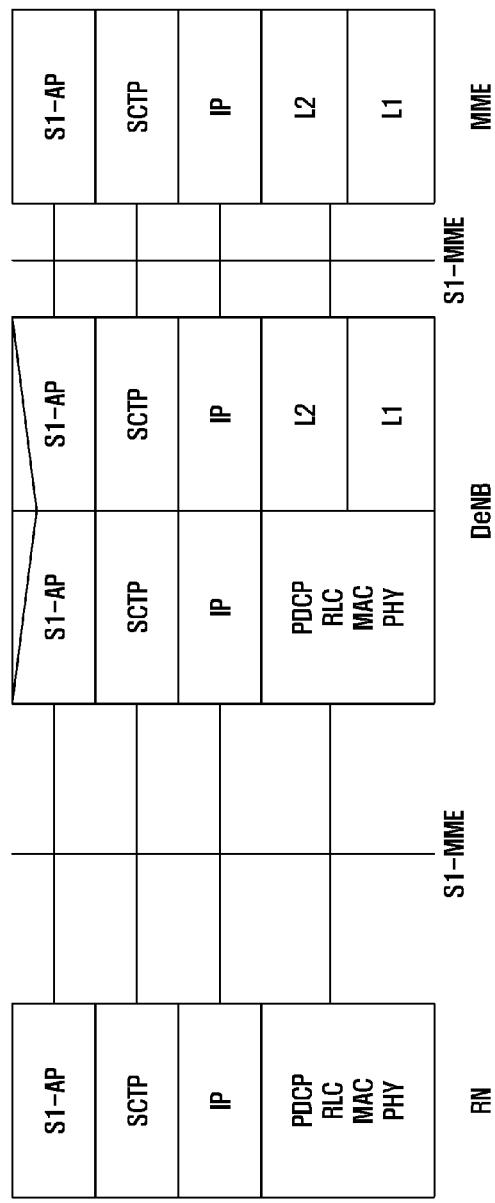
[Fig. 2]

[Fig. 3]
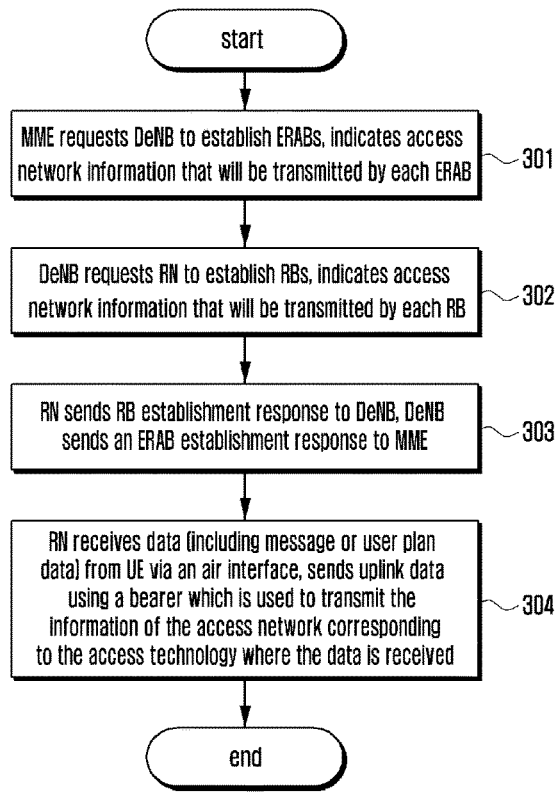
[Fig. 4]
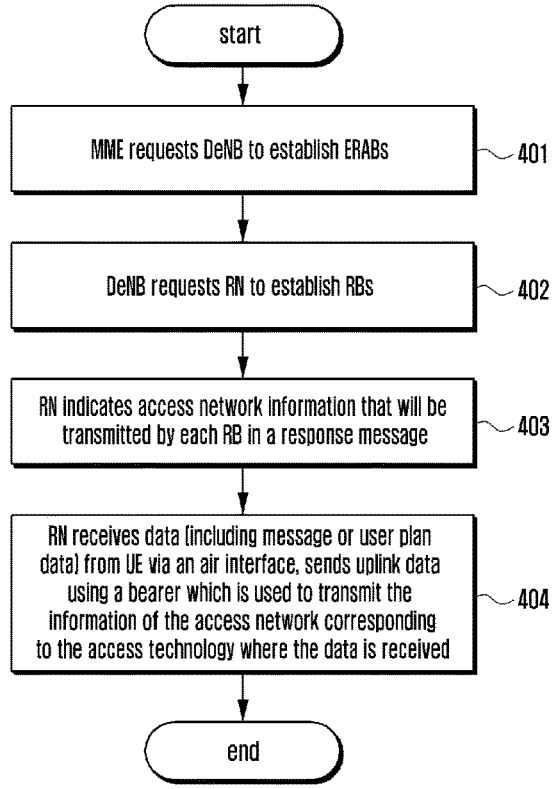

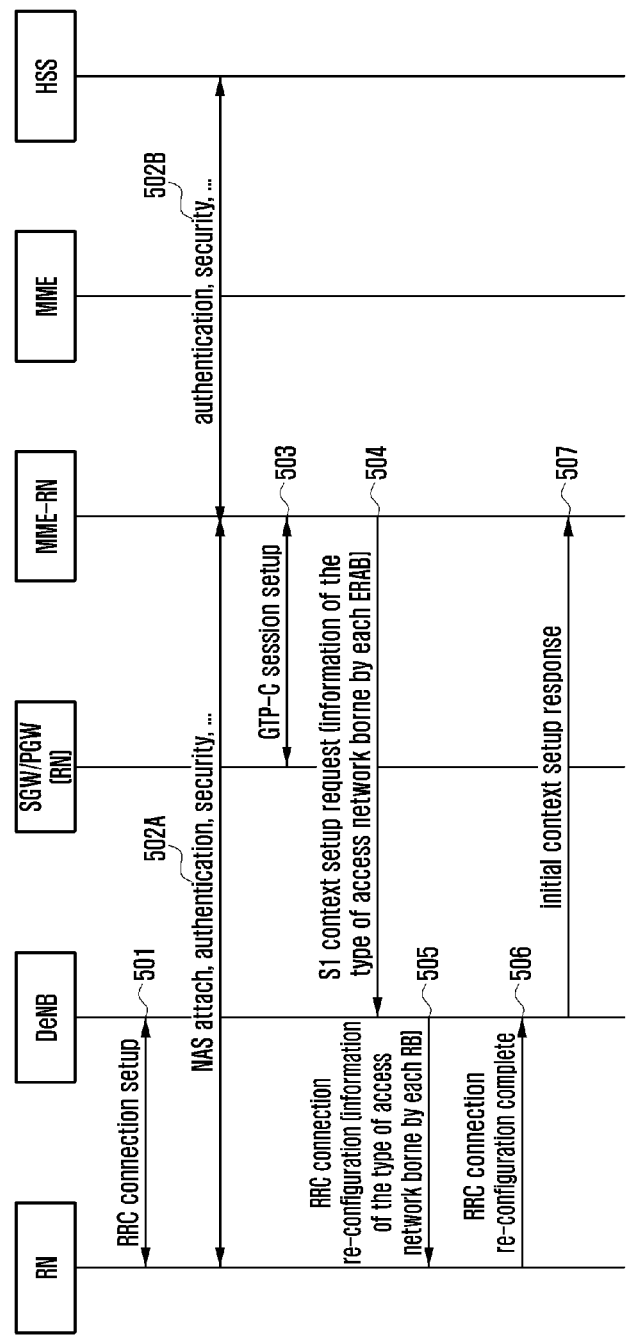
[Fig. 5]

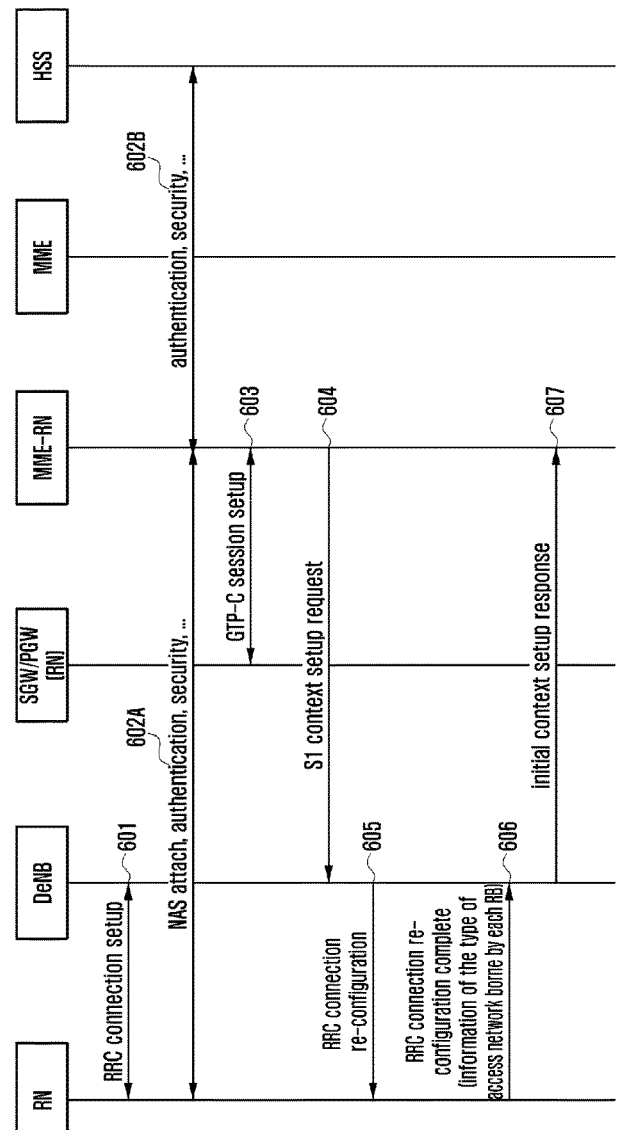
[Fig. 6]
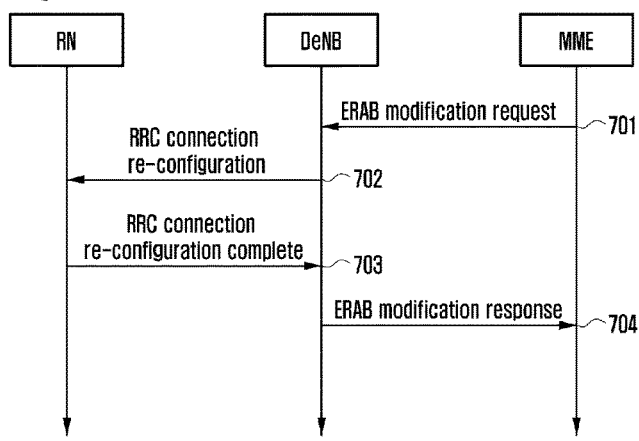
[Fig. 7]

[Fig. 8]
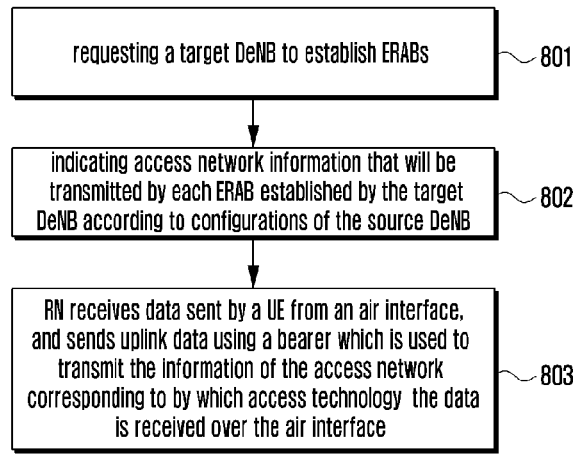
[Fig. 9]
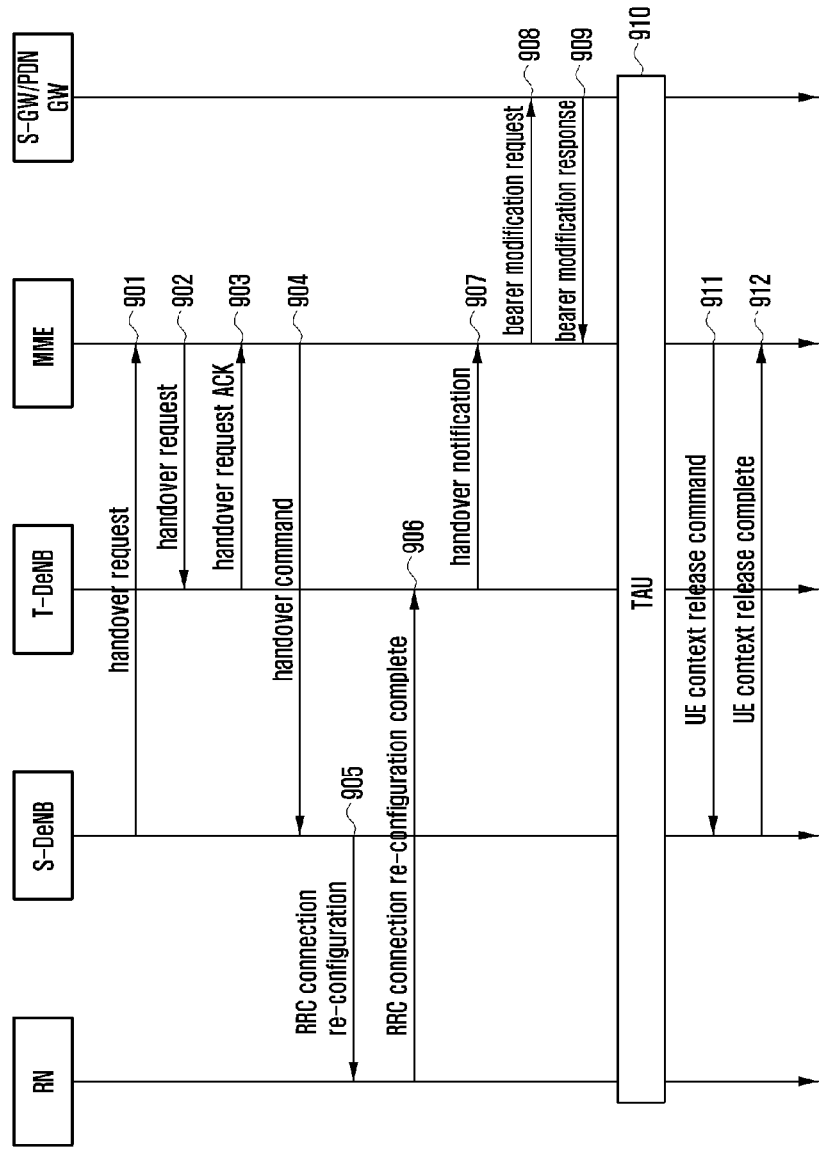

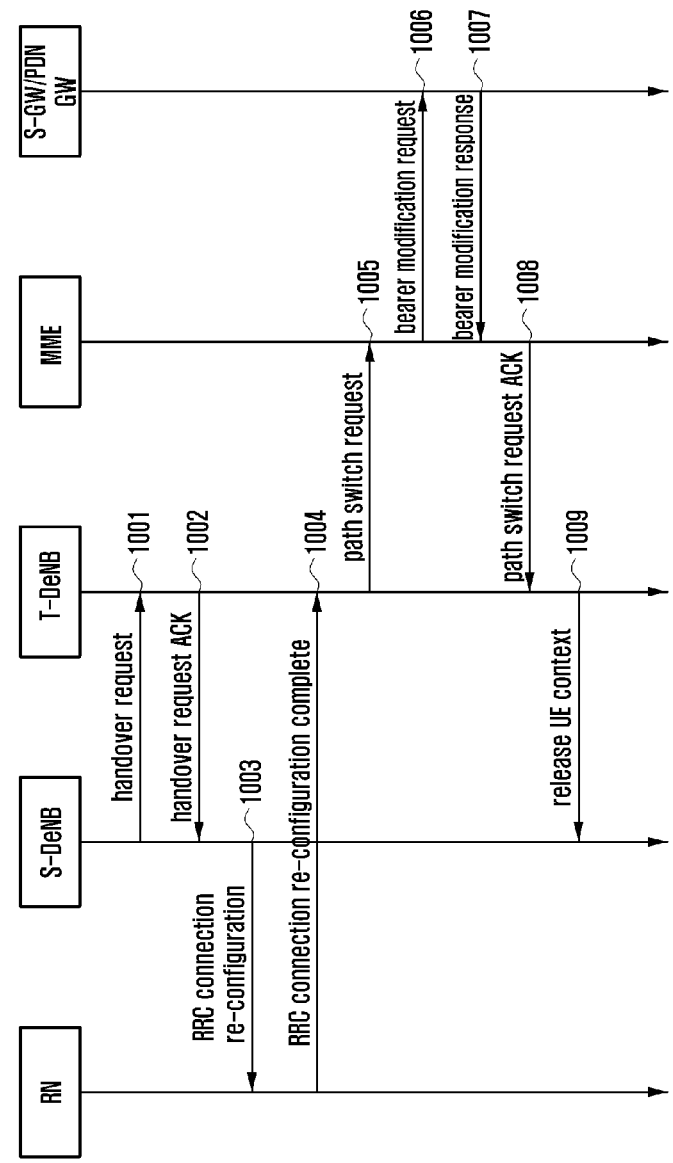
[Fig. 10]

[Fig. 11]
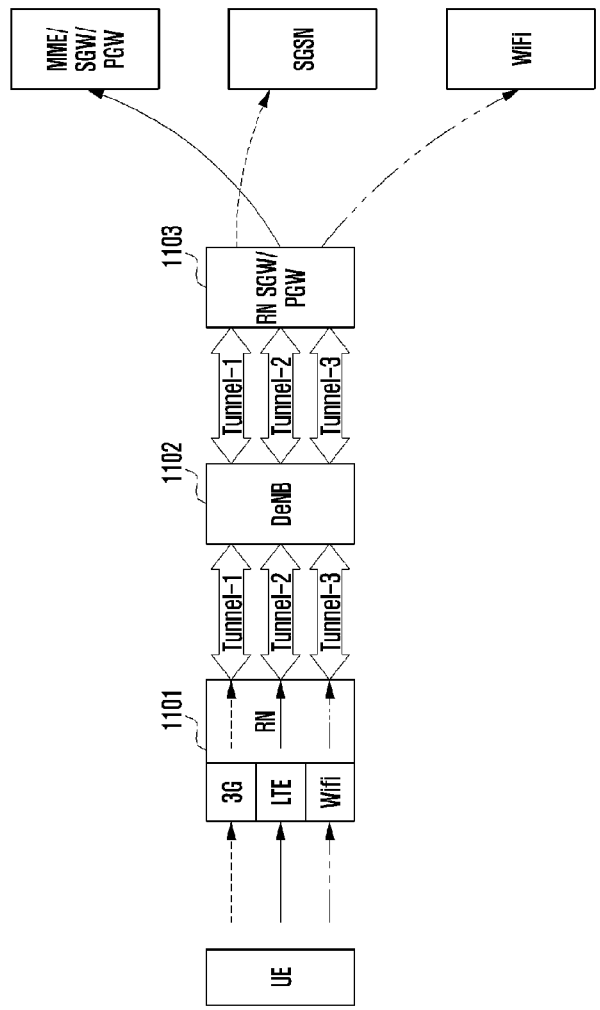
[Fig. 12]
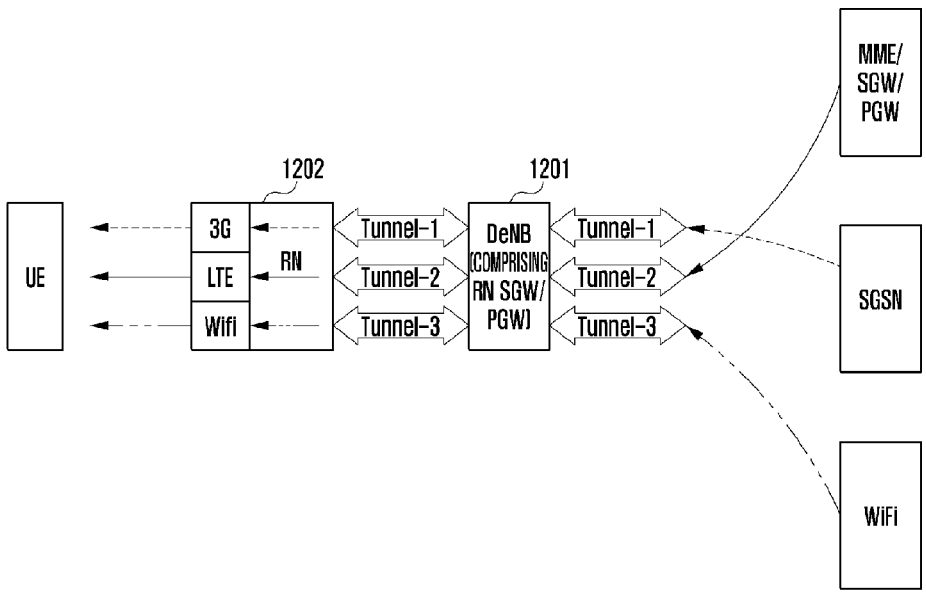

[Fig. 13]
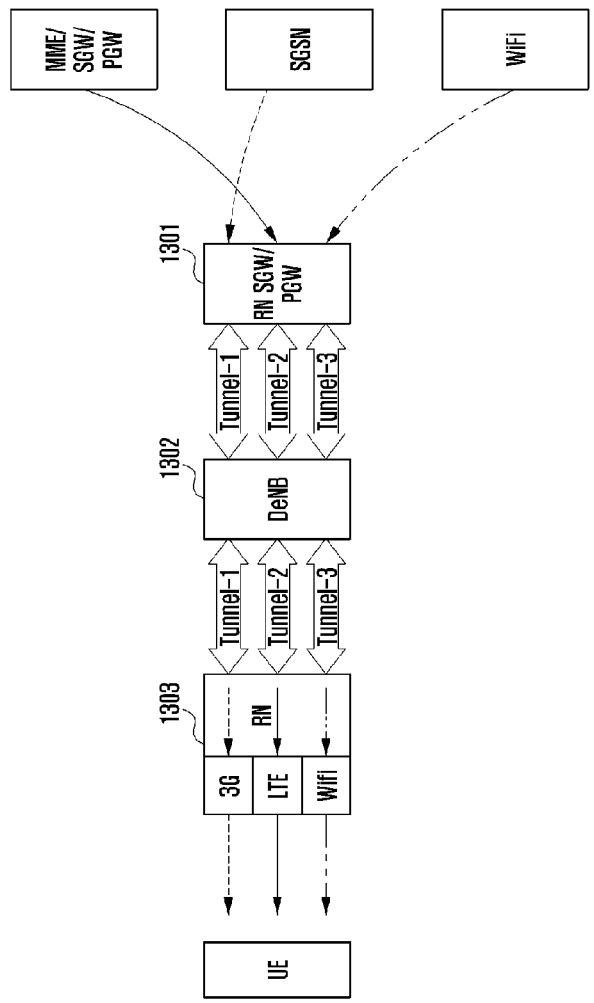
[Fig. 14]
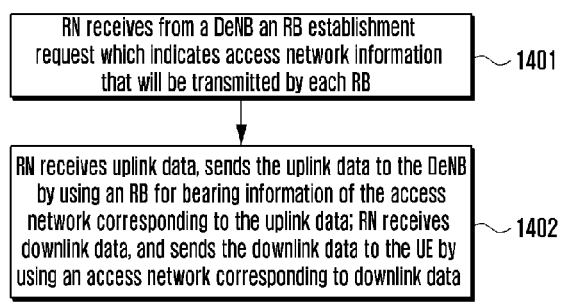
[Fig. 15]
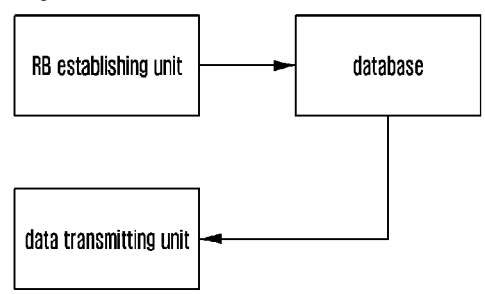

METHOD ENABLING AN RN TO SUPPORT MULTIPLE WIRELESS ACCESS SYSTEMS

CROSS-REFERENCE TO RELATED APPLICATION

The present application claims priority under 35 U.S.C. § 365 to international Patent Application No. PCT/KR2013/006688 filed Jul. 25, 2013, entitled "METHOD ENABLING AN RN TO SUPPORT MULTIPLE WIRELESS ACCESS SYSTEMS". International Patent Application No. PCT/KR20131006688 claims priority under 35 U.S.C. § 365 and/or 35 U.S.C. § 119(a) to Chinese Patent Application No. 20121.0276182.6 filed Aug. 3, 2012, and which is incorporated herein by reference into the present disclosure as if fully set forth herein.

TECHNICAL FIELD

The present invention relates to mobile communication systems, and particularly, to a method enabling a relay node (RN) to support multiple wireless accessing systems.

BACKGROUND ART

FIG. 1 is a schematic illustrating a conventional structure of an LTE system supporting RN. As shown in FIG. 1, in an access network of an LTE system, wireless resource management entities may include macro base stations (eNB) 101 and relay nodes (RN) 102. The RNs access a core network via another type of macro base stations (DeNB) 103. The eNBs 101 are connected with each other via X2 interfaces. Each of the eNBs 101 are connected with a mobility management entity (MME) and a serving gateway (S-GW) 104 in the core network via S1 interfaces. The RNs 102 access the DeNBs 103 via Un interfaces. DeNBs 103 provide X2 proxy functions between RNs 102 and other eNBs. DeNBs 103 provide S1 proxy functions between RNs 102 and MME/SGWs 104. S1 proxy functions and X2 proxy functions include transmission of UE-dedicated X2 signaling and S1 signaling between RNs 102 and eNBs 101 and between RNs 102 and MMEs 104, and transmission between RNs 102 and SGWs 104.

FIG. 2 is a schematic diagram illustrating a conventional control plane protocol stack of an S1 interface supporting relay. There is an S1 interface between an RN and a DeNB of the RN, and there is an S1 interface between a DeNB and each MME in an MME pool. A DeNB processes and forwards all UE-dedicated S1 signaling between an RN and an MME. The processing of UE-dedicated S1 messages by a DeNB includes modifying S1-application protocol UE identifications (S1-AP UE IDs), transport layer addresses and GPRS tunneling protocol (GTP) tunnel endpoint IDs (TEID) while keeping other parts of the messages unchanged.

DISCLOSURE OF INVENTION

Technical Problem

A conventional RN supports only LTE accessing technique at both the Uu interface and the Un interface. Operators of further mobile RNs used on trains have demands in making the Uu interface support multiple accessing techniques to satisfy the need of terminals on a train using multiple different wireless accessing techniques. But it is still a problem yet to be solved that there is no technical scheme which supports multiple accessing techniques while having less impact on conventional networks.

Solution to Problem

Embodiments of the present invention provide a method enabling an RN to support multiple wireless accessing techniques to reduce modifications to conventional networks and techniques while guaranteeing service quality provided for a UE accessing LTE and to make an RN support access from UEs using multiple accessing techniques.

A method enabling a relay node (RN) to support multiple wireless access systems may include:

a. requesting, by a mobility management entity (MME), a DeNB to establish evolved radio access bearers (ERAB), and indicating access network information that will be transmitted by each of the ERABs;

b. requesting, by a DeNB, an RN to establish radio bearers (RB) and indicating access network information that will be transmitted by each of the RBs;

c. sending, by the RN, an RB establishment response to the DeNB, and sending, by the DeNB, an ERAB establishment response to the MME.

In an embodiment, a message for the MME requesting the DeNB to establish the ERABs comprises: an initial context setup request, or an ERAB establishment request, or an ERAB modification request.

In an embodiment, a message for the DeNB requesting the RN to establish the RBs comprises an RRC connection re-configuration request.

In an embodiment, the method may also include: after step c, receiving, by the RN, data from a UE, sending the data to the DeNB by using an RB for bearing access network information corresponding to the access technology by which the data is received; sending, by the DeNB, the data to a core network by using an ERAB corresponding to the RB for transmitting the data.

In an embodiment, the DeNB may also implement proxy functions for the data before sending the data to the core network in response to a determination that the access network information corresponding to the access technology by which the data is received is an LTE wireless access network.

In an embodiment, the DeNB may send the data to the core network transparently in response to a determination that the access network information corresponding to the access technology by which the data is received is not an LTE access network.

In an embodiment, the proxy functions may include: replacing UE S1 AP ID in the message; allocating a downlink TEID and replacing a transport layer address when the data is for establishing a user plane for the UE from an LTE access system accessing the RN.

In an embodiment, the MME informs a SGW/PGW of access network information that will be transmitted by each of the ERABs established by the DeNB when the DeNB and the SGW/PGW of the RN reside in different entities.

In an embodiment, when a message for the MME requesting the DeNB to establish the ERABs is an ERAB modification request, the indicating access network information that will be transmitted by each ERAB comprises: indicating access network information that will be transmitted by each ERAB after a change for each of ERABs whose information of access network suffers a change.

A method enabling a relay node (RN) to support multiple wireless access systems may include:

a. requesting, by a mobility management element (MME), a DeNB to establish evolved radio access bearers (ERAB) of EUTRAN, and requesting, by the DeNB, an RN to establish radio bearers (RB); and b. sending, by the RN, an RB establishment response to the DeNB, and indicating access network information that will be transmitted by each of the RBs in the response.

In an embodiment, a message for the MME requesting the DeNB to establish the ERABs comprises: an initial context setup request, or an ERAB establishment request, or an ERAB modification request.

In an embodiment, a message for the DeNB requesting the RN to establish the RBs comprises an RRC connection re-configuration request.

In an embodiment, the method may also include: after step b, c. receiving, by the RN, data from a UE, sending the data to the DeNB by using an RB for bearing an access network in which the data is received; sending, by the DeNB, the data to a core network by using an ERAB corresponding to the RB for transmitting the data.

In an embodiment, the DeNB may also implement proxy functions for the data before sending the data to the core network in response to a determination that the access network information corresponding to the access technology by which the data is received is an LTE wireless access network.

In an embodiment, the DeNB may send the data to the core network transparently in response to a determination that the access network information corresponding to the access technology by which the data is received is not an LTE access network.

In an embodiment, the proxy functions may include: replacing UE S1 AP ID in the message; allocating a downlink TEID and replacing a transport layer address when the data is for establishing a user plane for the UE from an LTE access system accessing the RN.

In an embodiment, the method may also include: between the step b and the step c, informing, by the DeNB, the MME of access network information that will be transmitted by each of the ERABs established by the DeNB.

In an embodiment, when a message for the MME requesting the DeNB to establish the ERABs is an ERAB modification request, the indicating access network information that will be transmitted by each ERAB comprises: indicating access network information that will be transmitted by each ERAB after a change for each of ERABs whose information of access network suffers a change.

A method of a relay node (RN) supporting multiple wireless access systems may include: during a handover of an RN, a. requesting a target DeNB to establish evolved radio access bearers (ERAB) of UTRAN;

b. informing the target DeNB of access network information that will be transmitted by each of the ERABs established by the target DeNB.

In an embodiment, when the handover is S1 handover, a message for requesting the target DeNB to establish the ERABs is a handover request sent by a mobility management element (MME).

In an embodiment, when the handover is X2 handover, a message for requesting the target DeNB to establish the ERABs is a handover request sent by a source DeNB.

In an embodiment, the step b is performed by a source DeNB or an MME or the RN.

In an embodiment, when the handover is S1 handover and the step b is performed by the source DeNB, the informing the target DeNB of access network information that will be transmitted by each of the ERABs is according to configurations of the source DeNB and comprises: indicating, by the source DeNB, the information in a handover required message sent to the MME or in a serving-to-target transparent container in the handover required message, and indicating, by the MME, access network information that will be transmitted by each of the ERABs in the handover request or in a serving-to-target transparent container in the handover request message.

In an embodiment, when the handover is S1 handover and the step b is performed by the RN, the indicating access network information that will be transmitted by each of the ERABs comprises: indicating the information in an RRC connection re-configuration complete message.

In an embodiment, when the handover is S1 handover and the step b is performed by the MME, the indicating access network information that will be transmitted by each of the ERABs comprises: indicating the information in the handover request by the MME.

In an embodiment, when the handover is X2 handover and the step b is performed by the source DeNB, the indicating access network information that will be transmitted by each of the ERABs is based on configurations of the source DeNB and comprises: indicating, by the source DeNB, the information in the handover request.

In an embodiment, when the handover is X2 handover and the step b is performed by the RN, the indicating access network information that will be transmitted by each of the ERABs comprises: indicating, by the RN, the information in an RRC connection re-configuration complete message.

In an embodiment, when the handover is X2 handover and the step b is performed by the MME, the indicating access network information that will be transmitted by each of the ERABs comprises: indicating, by the MME, the information in a path switch request acknowledgement.

In an embodiment, the method may also include: after step b, c. receiving, by the RN after the handover, data from a UE, sending the data to the target DeNB by using an RB for bearing an access network information corresponding to the access technology by which the data is received; sending, by the target DeNB, the data to a core network by using an ERAB corresponding to the RB for transmitting the data.

In an embodiment, the DeNB may also implement proxy functions for the data before sending the data to the core network in response to a determination that the access network information corresponding to the access technology by which the data is received is an LTE wireless access network.

In an embodiment, the DeNB may send the data to the core network transparently in response to a determination that the access network information corresponding to the access technology by which the data is received is not an LTE access network.

In an embodiment, the proxy functions may include: replacing UE S1 AP ID in the message; allocating a downlink TEID and replacing a transport layer address when the data is for establishing a user plane for the UE from an LTE access system accessing the RN.

A method enabling a relay node (RN) to support multiple wireless access systems may include:

a. receiving, by an RN, from a DeNB an RB establishment request which indicates access network information that will be transmitted by each RB;

b. receiving, by the RN, uplink data sent by the UE, and sending the uplink data to the DeNB by using an RB for bearing information of an access network corresponding to the uplink data; receiving, by the RN, downlink data sent by the DeNB, and sending the downlink data to the UE by using an access network corresponding to the downlink data.

A relay node (RN) may include: a radio bearer (RB) establishing unit, a database and a data transmitting unit; wherein the RB establishing unit is configured for receiving an RB establishment request from a DeNB and establishes RBs; receiving access network information that will be transmitted by each of the RBs in the RB establishment request, and storing the information in the database;

the data transmitting unit is configured for receiving uplink data sent by a UE, sending the uplink data to the DeNB by using an RB for transmitting information of an access network corresponding to the uplink data based on access network information that will be transmitted by each RB stored in the database; receiving downlink data sent by the DeNB, and sending the downlink data to the UE by using an access network corresponding to the RB that received the downlink data based on access network information that will be transmitted by each RB stored in the database.

Advantageous Effects of Invention

The above method makes fewer modifications to conventional networks and techniques, guarantees service quality provided for a UE accessing an LTE system, and enables an RN to support access of UEs using multiple access techniques.

BRIEF DESCRIPTION OF DRAWINGS

FIG. 1 is a schematic diagram illustrating a structure of a conventional LTE system supporting RN.

FIG. 2 is a schematic diagram illustrating a conventional control plane protocol stack of an S1 interface supporting RN.

FIG. 3 is a flowchart illustrating a first method enabling an RN to support multiple wireless access systems in accordance with an embodiment of the present invention.

FIG. 4 is a flowchart illustrating a second method enabling an RN to support multiple wireless access systems in accordance with an embodiment of the present invention.

FIG. 5 is a flowchart illustrating a method enabling an RN to support multiple wireless access systems in accordance with embodiment one of the present invention.

FIG. 6 is a flowchart illustrating a method enabling an RN to support multiple wireless access systems in accordance with embodiment two of the present invention.

FIG. 7 is a flowchart illustrating a method enabling an RN to support multiple wireless access systems in accordance with embodiment three of the present invention.

FIG. 8 is a flowchart illustrating a method enabling an RN to support multiple wireless access systems during handover in accordance with an embodiment of the present invention.

FIG. 9 is a flowchart illustrating a method enabling an RN to support multiple wireless access systems during S1 handover in accordance with an embodiment of the present invention.

FIG. 10 is a flowchart illustrating a method enabling an RN to support multiple wireless access systems during X2 handover in accordance with an embodiment of the present invention.

FIG. 11 is a flowchart illustrating a process of transmitting messages or data of different access systems according to a method enabling an RN to support multiple wireless access systems in accordance with an embodiment of the present invention.

FIG. 12 is a flowchart illustrating a downlink information transmission process in accordance with example one.

FIG. 13 is a flowchart illustrating a downlink information transmission process in accordance with example two.

FIG. 14 is a flowchart illustrating a method enabling an RN to support multiple wireless access systems.

FIG. 15 is a schematic diagram illustrating a detailed structure of an RN in accordance with an embodiment of the present invention.

MODE FOR THE INVENTION

In order to make the objectives, technical schemes and merits of the present invention clearer, a detailed description of the present invention is hereinafter given with reference to specific embodiments.

Two methods enabling an RN to support multiple wireless access systems are provided by embodiments of the present invention. The methods are described in the following with reference to the procedures shown in FIG. 3 and FIG. 4.

FIG. 3 is a flowchart of a first basic method. Following is detailed description of FIG. 3.

In block 301, a mobile management element (MME) requests a Donor NodeB (DeNB) to establish evolved radio access bearers (ERAB) of UTRAN, and indicates access network information that will be transmitted by each of the ERABs.

The message via which the MME requests the DeNB to establish the ERABs may be an initial context setup request or an ERAB establishment request or an ERAB modifying request, or other messages as long as key contents of the present invention are not influenced.

For example, when 3 ERABs are to be established, ERAB1 may used for transmitting information of a 3G system, ERAB2 may be used for transmitting information of an LTE system, and ERAB3 may be used for transmitting information of a WiFi accessing system.

In block 302, the DeNB requests an RN to establish radio bearers (RB), and indicates access network information that will be transmitted by each RB, where the access network is the same with an access network borne by the ERAB corresponding to the RB.

The bearer of an air interface between the DeNB and the core network is an ERAB, and the bearer of an air interface between the DeNB and the RN is an RB. There is a relation which associates the RB with the ERAB. In an embodiment, a pair of RB and ERAB which are associated with each other is used for transmitting information of the same access network, i.e., the RB and the ERAB are both used for transmitting information of an LTE system or of a WIFI network, and so on.

The DeNB has already obtained access network information that will be transmitted by each ERAB in block 301, thus may inform the RN of access network information that will be transmitted by an RB corresponding to an ERAB in this procedure.

The message via which the DeNB requests the RN to establish the RBs in this block may be a radio resource control (RRC) connection re-configuration request or other messages.

In block 303, the RN sends an RB establishment response to the DeNB, and the DeNB sends an ERAB establishment response to the MME.

Through the above process, the bearers between the RN, the DeNB and the core network have been established, and may be used for transmitting information of multiple access networks. The following procedure in block 304 implements data transmission using the established bearers.

In block 304, the RN receives a message or data from a UE, and sends the message or data to the DeNB via an RB which is used to transmit the information of the access network corresponding to the access technology where the message or data is received; the DeNB sends the message or data to the core network via an ERAB which is used to transmit the information of the access network corresponding to the access technology where the message or data is received over the air interface.

The RN may determine the access network of the UE after receiving the message from the UE (i.e., the access network corresponding to the access technology by which the data is received by the RN). The RN may determine the access network that the message belongs to based on different modules that receive messages, e.g., the message is determined to belong to a 3G system when the message is received by a 3G receiving module. Alternatively, the RN may determine the access system that the message belongs to by parsing the message received from the UE. The detailed determining method depends on the manner of implementing the internal functions of the RN, and is not limited herein.

The message sent by the UE may be a signaling message or data. The process of determining the access network that the message belongs to based on the message is the same with that in the prior art, and will not be described further herein.

When it is determined that the access network information corresponding to the access technology by which the data is received received by the RN is an LTE wireless access system, the DeNB may implement functions of a proxy for the message, e.g., replacing the UE S1 AP ID which includes an eNB UE S1 AP ID and an MME UE S1 AP ID in the message; when the message is for establishing a user plane for a UE accessing an LTE access system via the RN, e.g., an ERAB message, the DeNB may further allocate a downlink tunnel endpoint ID (TEID), replace the transport layer address in the message while keeping other parts of the message unchanged. If the access network information corresponding to the access technology by which the data is received received by the RN is a non-LTE access system, e.g., 3G or WiFi and so on, the DeNB may transmit the received message to the core network transparently.

FIG. 4 is a flowchart illustrating a second method enabling an RN to support multiple wireless access system in accordance with an embodiment of the present invention. Following is detailed description of FIG. 4.

In block 401, an MME requests a DeNB to establish ERABs.

The message via which the MME requests the DeNB to establish the ERABs may be an initial context setup request or an ERAB setup request or an ERAB modification request, or other messages as long as key contents of the present invention are not impacted.

In block 402, the DeNB requests an RN to establish RBs.

The message via which the DeNB requests the RN to establish the RBs may be an RRC connection re-configuration message or other messages.

In block 403, the RN sends an RB establishment response to the DeNB, and indicates access network information that will be transmitted by each of the RBs in the response.

In this process, the RN informs the DeNB of the access network information that will be transmitted by each RB established by the RN, thus the DeNB obtains access network information that will be transmitted access network information that will be transmitted by each ERAB because each RB corresponds to an ERAB.

Procedure in block 404 is the same with that in block 304, thus will not be further described herein.

It can be seen that access network information that will be transmitted by each bearer of the DeNB is sent to the DeNB by the MME and to the RN by the DeNB in the first method, but is sent to the DeNB by the RN in the second method. The above two methods are applicable to the RN attach procedure or the bearer modification procedure, and details are described in the following.

EMBODIMENT ONE

FIG. 5 is a flowchart illustrating a process enabling an RN to support multiple wireless access systems in accordance with embodiment one of the present invention. The embodiment applies the above first method to an attach procedure. The serving gateway (SGW)/packet data network (PDN) gateway (PGW) of the RN in the method may be a stand-alone entity or within the DeNB or other entities, and this is unimportant to the present invention and should not be used for limiting the present invention. In the following description, functional entities are used as an example for illustrating the process. Following is a detailed description of FIG. 5.

In block 501, an RN sends an RRC connection request to a DeNB, the DeNB sends an RRC connection setup message to the RN, and the RN sends an RRC connection setup complete message to the DeNB.

In block 502, a non-access stratum (NAS) attach procedure which connects the RN to the network and an authentication and security (AS) procedure are performed. An Evolved Packet Core (EPC) checks whether the RN has passed the authenticated, and accepts the attach if the RN has passed the authentication, or rejects the attach if the RN failed to pass the authentication.

The serving MME of the RN is referred to as an MME-RN.

In block 503, a GPRS tunneling protocol control part (GTP-C) session is established for the RN.

When the SGW/PGW of the RN resides in the same entity with the DeNB, the SGW-PGW may obtain the access system information that will be transmitted by each ERAB in block 504, and therefore information transmission for the access system is implemented. When the SGW/PGW of the RN and the DeNB reside in different entities, the MME may also inform the SGW/PGW of the RN of the access system information that will be transmitted by each ERAB established.

In block 504, the MME-RN sends to the DeNB an S1 context setup request which may include a NAS connection accept message and an ERAB establishment list.

In an embodiment, the S1 context setup request may include an ERAB establishment list and information about an access system for which information transmission is implemented by each of the ERAB to be established. The detailed process is the same with that in block 301, thus will not be described further.

In block 505, the DeNB sends to the RN an RRC connection re-configuration request which may include an NAS connection accept message and an RB establishment list and access network information that will be transmitted by each of the RBs to be established.

As in the above, a pair of RB and ERAB which correspond to each other in the DeNB are used for transmit information of the same access network, therefore, access network information that will be transmitted by each RB is specified by using access network information that will be transmitted by the ERAB corresponding to the RB received in block 504.

In block 506, the RN sends an RRC connection re-configuration complete message to the DeNB.

In block 507, the DeNB sends an initial context setup request to the MME-RN.

Through the method of the embodiment, bearers for transmitting information of different access systems have been established between the RN and the DeNB. The method for transmitting information of the different access systems using the established bearers will be described in FIG. 11.

EMBODIMENT TWO

FIG. 6 is a flowchart illustrating a process enabling an RN to support multiple wireless access systems in accordance with embodiment two of the present invention. The embodiment applies the above second method to an attach procedure. The SGW/PGW of the RN in the method may be a standalone entity or within the DeNB or other entities, and this is unimportant to the present invention and should not be used for limiting the present invention. In the following description, functional entities are used as an example for illustrating the process. The following is a description of FIG. 6. Procedures irrelevant to the present invention are neglected.

In block 601, an RN sends an RRC connection request to a DeNB, the DeNB sends an RRC connection setup message to the RN, and the RN sends an RRC connection setup complete message to the DeNB.

In block 602, a NAS attach process from the RN to the network and an authentication and security process are performed. An EPC checks whether the RN has passed the authentication, and accepts the attach in response to a determination that the RN has passed the authentication, or rejects the attach in response to a determination that the RN fails to pass the authentication.

The serving MME of the RN is referred to as an MME-RN.

In block 603, a GPRS tunneling protocol control part (GTP-C) session is established for the RN.

In block 604, the MME-RN sends to the DeNB an S1 context setup request which may include a NAS connection accept message and an ERAB establishment list.

In block 605, the DeNB sends to the RN an RRC connection re-configuration request which may include a NAS connection accept message and an RB establishment list.

In block 606, the RN sends an RRC connection re-configuration complete message to the DeNB and indicates information of the access system whose information transmission is borne by each of the RBs established.

The detailed process is the same with that in block 403, thus will not be described further.

In block 607, the DeNB sends an initial context setup response to the MME-RN.

In an embodiment, the initial context setup response may also include access network information that will be transmitted by each of the ERABs established. When the SGW/PGW of the RN and the DeNB resides in different entities, the MME-RN may also send the access system information that will be transmitted by each ERAB established to the SGW/PGW of the RN.

Through the method of the embodiment, bearers for transmitting information of different access systems have been established between the RN and the DeNB. The method for transmitting information of the different access systems using the established bearers will be described in FIG. 11.

The above embodiment one and embodiment two respectively describe implementations of the method provided the present invention in an RN attach scenario. The above method enables an RN to establish bearers for transmitting information of different access networks with a DeNB in the attach procedure. Subsequent data transmission (including control plane signaling for the RN to serve a UE) may utilize the established bearers to transmit information of the different access systems. In subsequent service processing, there may be the need of modifying the bearers previously established in response to a determination that the bearers previously established are not suitable for current data transmission environment or due to other reasons. The following is a description of applying the method of the present invention to a bearer modification procedure.

EXAMPLE THREE

FIG. 7 is a flowchart illustrating a method enabling an RN to support multiple wireless access systems in accordance with embodiment three of the present invention. The embodiment describes applying the first method and the second method to the bearer modification procedure. The SGW/PGW of the RN in the method may be a standalone entity or within the DeNB or other entities (e.g., in an initial DeNB), and this is unimportant to the present invention and should not be used for limiting the present invention. In the following description, functional entities are used as an example for illustrating the process. The following is a description of FIG. 7. The embodiment takes the application of the first method as an example. Procedures irrelevant to the present invention are neglected.

In block 701, an MME-RN sends an ERAB modification request to a DeNB and indicates access network information that will be transmitted by a new ERAB in the request.

The manner of indicating access system information that will be transmitted by the new ERAB may include: ERABs whose access network information is to be modified and detailed information of the modification as compared with previously established ERABs. After receiving the request, the DeNB modifies transmission attributes of the ERABs specified in the request. Alternatively, a new list of access systems to be transmitted by all of the previously established ERABs may be specified, and the DeNB may re-write the information of the access network borne by each of the ERABs.

In block 702, the DeNB sends an RRC connection re-configuration request to the RN, and indicates the information of the access network to be borne by a new RB in the request.

The manner of indicating access system information that will be transmitted by the new RB may include: RBs whose access network information is to be modified and detailed information of the modification as compared with previously established RBs. After receiving the request, the RN modifies transmission attributes of the RBs specified in the request. Alternatively, a new list of access systems to be transmitted by all of the previously established RBs may be specified, and the RN may re-write the information of the access network borne by each of the RBs.

In block 703, the RN sends an RRC connection reconfiguration complete message to the DeNB.

In block 704, the DeNB sends an ERAB modification response to the MME-RN.

Through the method of the embodiment, bearers for transmitting information of different access systems have been re-configured between the RN and the DeNB. The method for transmitting information of the different access systems using the different bearers will be described in FIG. 11.

In the process of the two basic methods, the DeNB and the RN should be informed of the bearers to be established and information of the access systems to be transmitted by the bearers, and information of the bearers in the DeNB and the RN should be synchronized during the initial establishment of the bearers and during modifications to the established bearers. In an RN handover procedure, effective bearers (including ERABs and RBs) have been established between the RN, a serving DeNB and an upper layer node of the serving DeNB for transmitting information of different access networks. During handover, it may require that bearers be established between the RN and a target DeNB and an upper layer node of the target DeNB to avoid major modifications. The RN may maintain previous information of the RB bearers, i.e., the access network information that will be transmitted by each RB, and request the target DeNB to establish the same bearers (including RBs and ERABs) with those of the serving DeNB to resume information transmission between the RN, the target DeNB and the upper layer node of the target DeNB for the different access systems. The target DeNB establishing the same bearers with those of the serving DeNB refers to the ERABs have the same IDs or the same indices, and ERABs having the same IDs or the same indices bear the same type of access network.

FIG. 8 is a flowchart illustrating a method enabling an RN to support multiple wireless access systems applied to a handover procedure. As shown in FIG. 8, the method may include the following procedures.

In block 801, a target DeNB is requested to establish ERABs.

The entity that performs this procedure may be different depending on the handover mode adopted. In an embodiment, when S1 handover is performed (i.e., the handover from the source DeNB to the target DeNB is implemented through an MME), an MME may execute the procedure in this block; when X2 handover is performed (i.e., the handover is directly carried out over X2 interface between the source DeNB to the target DeNB), the source DeNB may execute the procedure in this block.

In block 802, the target DeNB is informed of access network information that will be transmitted by each of the ERABs established.

As described above, the RN does not modify the type of the access network borne by each RB, therefore, the type of the access network borne by each ERAB established by the target DeNB may be kept in consistent with that of the source DeNB.

This block may be implemented through the following three manners.

Manner one may include: the source DeNB sends access network information that will be transmitted by each bearer to the target DeNB.

Manner two may include: the RN informs the target DeNB of access network information that will be transmitted by each bearer.

Manner three may include: the MME informs the target DeNB of access network information that will be transmitted by each bearer.

After this procedure, the DeNB has obtained access network information that will be transmitted by each ERAB established. The SGW and the PGW of the RN remains unchanged during the handover, the SGW and the PGW have obtained access network information that will be transmitted by each ERAB during the initial attach procedure.

In block 803, the RN receives a message or data sent by a UE after the handover, determines the access network of the UE, and sends the message or data to the target DeNB in an RB for transmitting information of the access network; the target DeNB sends a message or data to the core network by using an ERAB corresponding to the RB bearing the information of the access network corresponding to by which access technology the data is received over the air interface.

The detailed procedure in this block is the same with that in block 304, thus will not be described further herein.

Two examples are described in the following to illustrate implementations of the method enabling an RN to support multiple access networks during handover. Embodiment four describes the implementation in case of S1 handover, while embodiment five describes the implementation in case of X2 handover.

EMBODIMENT FOUR

FIG. 9 is a flowchart illustrating a process enabling an RN to support multiple wireless access systems during S1 handover. The SGW/PGW of the RN in the method may be a standalone entity or within the DeNB or other entities (e.g., in an initial DeNB), and this is unimportant to the present invention and should not be used for limiting the present invention. In the following description, functional entities are used as an example for illustrating the process. The following is a description of FIG. 9. Procedures irrelevant to the present invention are neglected.

In block 901, a source DeNB sends a handover request to an MME.

The process of the RN sending a measurement report to the source DeNB and the source DeNB initiating the handover will not be described.

As described above, there are three manners for informing the target DeNB of access network information that will be transmitted by each bearer.

Corresponding to the manner one of informing the target DeNB of access network information that will be transmitted by each bearer, the access network information that will be transmitted by each bearer is transmitted in the handover request or a serving-to-target transparent container in the handover request.

In block 902, the MME sends a handover request to a target DeNB.

Corresponding to the manner three of informing the target DeNB of access network information that will be transmitted by each bearer, the access network information that will be transmitted by each bearer is transmitted in the handover request.

Corresponding to the manner one of informing the target DeNB of access network information that will be transmitted by each bearer, the access network information that will be transmitted by each bearer is transmitted in the handover required or a serving-to-target transparent container in the handover required message. In an example of the manner one, the source DeNB sends the access network information that will be transmitted by each bearer (which is referred to as bearer information in the following for short) to the MME, and the MME sends the bearer information to the target DeNB via the handover request message. In the process, the bearer information is transmitted in positions other than the source-to-target transparent container in the handover request.

In another example of the manner one, the source DeNB loads the bearer information into the source-to-target transparent container in the handover request, and the MME forwards the bearer information to the target DeNB. In this manner, after receiving the handover request, the MME does not parse the source-to-target transparent container, but directly loads the container into the handover request which is then transmitted to the target DeNB. Therefore, processing in the MME is rather simple.

The sourceDeNB refers to the DeNB that the RN previously attaches to, and the target DeNB refers to the DeNB that the RN is going to be handed over to.

In block 903, the target DeNB allocates resources for the RN, and sends a handover request acknowledgement to the MME.

In block 904, the MME sends a handover command to the serving DeNB.

In block 905, the source DeNB sends an RRC connection re-configuration message to the RN.

In block 906, the RN is synchronized to a target cell, and sends an RRC connection re-configuration complete message to the target DeNB.

Corresponding to the manner two of informing the target DeNB of access network information that will be transmitted by each bearer, the access network information that will be transmitted by each bearer is transmitted in the RRC re-configuration complete message.

In block 907, the target DeNB sends a handover notification to the MME.

In block 908, the MME sends a bearer update request to the SGW/PGW.

The SGW is mainly for providing user plane functions; the PDN GW is mainly for implementing functions including accounting and legal monitoring and so on. The SGW and the PGW may reside in the same entity or in two entities. The description of this procedure omits the signaling interactions between the SGW and the PGW.

In block 909, the SGW/PGW sends a bearer update response to the MME.

In block 910, the RN initiates a tracking area update (TAU) procedure.

In block 911, the MME sends a UE context release command to the serving DeNB.

In block 912, the sourceDeNB sends a UE context release complete message to the MME.

Through the method of the embodiment, bearers for transmitting information of different access systems have been established between the RN and the target DeNB. The method for transmitting information of the different access systems using the established bearers will be described in FIG. 11.

EMBODIMENT FIVE

FIG. 10 is a flowchart illustrating a process enabling an RN to support multiple wireless access systems during X2 handover. The SGW/PGW of the RN in the method may be a standalone entity or within the DeNB or other entities (e.g., in an initial DeNB), and this is unimportant to the present invention and should not be used for limiting the present invention. In the following description, functional entities are used as an example for illustrating the process. The following is a description of FIG. 10. Procedures irrelevant to the present invention are neglected.

In block 1001, a source DeNB (S-DeNB) decides to initiate a handover of an RN. The S-DeNB may send a handover request to a target DeNB (T-DeNB).

As described above, there are three manners for informing the target DeNB of access network information that will be transmitted by each bearer.

Corresponding to the manner one of informing the target DeNB of access network information that will be transmitted by each bearer, the access network information that will be transmitted by each bearer is transmitted in the handover request.

In block 1002, the T-DeNB sends a handover request acknowledgement to the S-DeNB.

In block 1003, the source DeNB sends an RRC connection re-configuration message to the RN.

In block 1004, the RN is synchronized to a target cell, and sends an RRC connection re-configuration complete message to the target DeNB.

Corresponding to the manner two of informing the target DeNB of access network information that will be transmitted by each bearer, the access network information that will be transmitted by each bearer is transmitted in the RRC re-configuration complete message.

In block 1005, the T-DeNB sends a path switch request to an MME.

In block 1006, the MME sends a bearer update request to the SGW/PGW of the RN.

In block 1007, the SGW/PGW of the RN sends a bearer update response to the MME.

In block 1008, the MME sends a path switch request acknowledgement.

Corresponding to the manner three of informing the target DeNB of access network information that will be transmitted by each bearer, the access network information that will be transmitted by each bearer is transmitted in the path switch request acknowledgement.

In block 1009, the T-DeNB sends a UE context relapse message to the S-DeNB.

Through the method of the embodiment, bearers for transmitting information of different access systems have been established between the RN and the target DeNB. The method for transmitting information of the different access systems using the established bearers will be described in FIG. 11.

EMBODIMENT SIX

FIG. 11 is a flowchart illustrating a method enabling an RN to support multiple wireless access systems in accordance with embodiment six of the present invention. This embodiment provides a process of transmitting information of different access systems by using different bearers.

In embodiments of the present invention, the SGW/PGW may be a standalone entity or reside in a DeNB or other entities, or may reside in the same entity after the attach procedure and before a movement of the RN and reside in an initial DeNB after a movement of the RN. This is not important to the present invention, and should not be used for limiting the present invention.

The following is a description of FIG. 11. Procedures irrelevant to the present invention are neglected.

Through the above embodiments, bearers for transmitting information of different access systems have been established between the RN and the DeNB, which are labeled as Tunnels in the drawings, and they refer to the same concept. According to an embodiment, the SGW and the PGW of the RN may reside in the same entity with the DeNB after the attach procedure and before a movement of the RN and reside in an initial DeNB after a movement of the RN. When the SGW/PGW reside in the same entity with the DeNB, the tunnels between the DeNB and the SGW/PGW are implemented inside the entity, and thus can be omitted.

In block 1101, an RN receives a message from an air interface, e.g., a message from a 3G access system.

The RN determines bearer 1 is for transmitting information of a 3G access system from information obtained during the bearer establishment procedure. The RN sends the received message to the DeNB by using bearer 1.

In block 1102, the DeNB sends the message received to an upper layer node by using a bearer that is established for transmitting the information of the access network corresponding to in which access technology the message is received from the air interface e.g. ERAB 1 which is used to transmit the information of a 3G access system.

The upper layer node may be the SGW/PGW of the RN or an MME, or an SGSN, or a WiFi system or other systems. If the message received by the DeNB is from an LTE system, e.g., the message is received from bearer 2, the DeNB processes the LTE message according to a conventional method, e.g., update UE S1 AP ID; if the message received is for establishing a bearer for a UE accessing the RN, the DeNB may also allocate a downlink TEID and replace a transport layer besides updating the UE S1 AP ID; if the message receives belongs to an access system other than LTE, the DeNB transmits the message to the upper layer node transparently.

When the RN makes no movements after the attach procedure, the upper layer node may be a node of another core network, e.g., an MME, or an SGSN and so on.

When the RN makes no movements after the attach procedure, the SGW/PGW of the RN resides in the same entity, thus the SGW/PGW of the RN also has the information of the access network borne by each bearer, i.e., the access network information that will be transmitted by each bearer. If the RN has made a movement or the SGW/PGW of the RN does not reside in the same entity with the DeNB, the procedure in block 1103 is performed.

In block 1103, the SGW/PGW of the RN sends the message received to a core network node of the access system corresponding to the message in which access technology it is received. When the SGW/PGW of the RN does not reside in the same entity with the DeNB, the SGW/PGW of the RN also need to obtain the access network information that will be transmitted by each bearer, i.e., the information of the access network borne by each bearer.

The SGW/PGW may be informed of access network information that will be transmitted by each bearer between the SGW/PGW by the MME after the block 503 or 607.

The above FIG. 11 illustrates information transmission from the RN to the DeNB and to the core network (i.e., uplink direction). FIG. 12 and FIG. 13 illustrate information transmission from the core network to the DeNB and to the RN (i.e., downlink direction). The SGW/PGW of the RN and the DeNB reside in the same entity in FIG. 12, and in different entities in FIG. 13 (which may also be applied to cases where the SGW/PGW of the RN was in the same entity with the DeNB and resides in the same entity with an initial DeNB but in different entities with the target DeNB after a movement of the RN).

As shown in FIG. 12, when the SGW/PGW of the RN resides in the same entity with the DeNB, the process of downlink information transmission according to an example may include the following procedures.

In block 1201, a DeNB receives a message sent by an upper layer node in the core network.

The upper layer node may be an MME, or an SGSN, or a WiFi system or other systems. Since the SGW/PGW of the RN resides in the same entity with the DeNB, the message sent to the SGW/PGW of the RN means the message is also sent to the DeNB. The DeNB determines the access system the message belongs to based on the ERAB which bear the message or according to another method which is not limited in this application.

In block 1202, the DeNB sends the received message to the RN using a bearer for transmitting information of the access network.

After the access system the received message belongs to is determined in block 1201, the message is sent to the RN using an RB that is established for transmitting the information of the access network corresponding to the access system the message belongs to.

In an embodiment, when sending the message to the RN, the following aspects may be taken into consideration: if the message received by the DeNB is from an LTE system, e.g., the message is received from bearer 2, the DeNB may process the LTE message according to a conventional method, e.g., update UE S1 AP ID; if the message received is for establishing a bearer for a UE accessing the RN, the DeNB may also allocate a downlink TEID and replace a transport layer address besides updating the UE S1 AP ID; if the message received belongs to an access system other than LTE, the DeNB may transmit the message to the upper layer node transparently.

FIG. 13 is a flowchart illustrating a process of downlink information transmission when a DeNB and a SGW/PGW of an RN reside in different entities in accordance with example two. As shown in FIG. 13, the process may include the following procedures.

In block 1301, the SGW/PGW of an RN receives a message sent by a core network node, and determines an access network the message initiates from.

The upper layer node may be an MME, or an SGSN, or a WiFi system or other systems. The SGW/PGW of the RN may determine the source of the message based on the message received. The detailed determining method is not limited herein.

In block 1302, a DeNB receives the message sent by the SGW/PGW of the RN.

After determining the access network originating the message received, the SGW/PGW of the RN sends the received message to the DeNB by using an ERAB for transmitting information of the access network. The DeNB determines the access system that originated the message according to the ERAB which bear the message.

In block 1303, the DeNB sends the message received to an RN by using a bearer that is established for transmitting the information of the access network corresponding to the access system the message belongs to.

After the access system the received message is originated from is determined in block 1302, the message is sent to the RN using an RB corresponding to the access system.

In an embodiment, when the message is sent to the RN, the following aspects may be taken into consideration: if the message received by the DeNB is from an LTE system, e.g., the message is received from bearer 2, the DeNB may process the LTE message according to a conventional method, i.e., implement proxy functions, e.g. e.g., update UE S1 AP ID; if the message from the core network is for establishing a user plane for a UE in the LTE system to access the RN, the proxy functions of the DeNB may also include allocating a downlink TEID and replacing a transport layer address; if the message received originated from an access system other than LTE, the DeNB may transmit the message to the upper layer node transparently.

The RN can send the message to the UE using corresponding access technology.

The method enabling an RN to support multiple access systems may involve processing in an RN, processing in a DeNB, and possibly, processing in an MME. Corresponding to the processing in an RN, a method enabling support of multiple wireless access systems is provided. As shown in FIG. 14, the method may include the following procedures.

In block 1401, an RN receives from a DeNB an RB establishment request which indicates access network information that will be transmitted by each RB.

The RN receives from the DeNB an RB establishment request which indicates access network information that will be transmitted by each RB, i.e., the RN is informed of information of an access network whose information is transmitted by each RB. The RN establishes RBs according to the request, and stores access network information that will be transmitted by each of the RBs. After the RB establishment, data sent by UE from different access networks can be transmitted by using the corresponding bearer that is used to transmit the information of the access network.

In block 1402, the RN receives uplink data sent by the UE, and sends the uplink data to the DeNB by using an RB for bearing information of the access network; the RN receives downlink data sent by the DeNB, and sends the downlink data to the UE via the access network corresponding to the downlink data.

The above procedure is the method of performing information transmission by using the established RBs in an RN. The information transmission includes two directions, i.e., uplink direction and downlink direction. In an embodiment, in the uplink direction, after receiving uplink data, the RN may determine the access network corresponding to the uplink data, sends the uplink data to the DeNB via an RB that is used to bear the information of the access network corresponding to the uplink data; in the downlink direction, after receiving the downlink data, the RN determines the access network corresponding to the downlink data, and sends the downlink data to the UE via the access network.

During the uplink/downlink data transmission, in the uplink direction, the DeNB implements proxy functions on the uplink data sent by the RN in response to a determination that the uplink data corresponds to an LTE wireless access network, and then sends the uplink data to the core network. The proxy functions may include replacing UE S1 AP ID in the message, and may also include allocating a downlink TEID and replacing a transport layer address in response to a determination that the uplink data received is data information for establishing a user plane for a UE in an LTE access system accessing the RN. The DeNB may transmit the uplink data received to the core network in response to a determination that the uplink data sent by the RN corresponds to a wireless access network other than LTE.

In the downlink direction, for the downlink data received by the RN from the DeNB, the DeNB implements the proxy functions on downlink data received from the core network in response to a determination that the downlink data corresponds to an LTE wireless access network. The proxy functions may include replacing UE S1 AP ID in the downlink data sent by the core network, and may also include allocating an uplink TEID and replacing a transport layer address in response to a determination that the downlink data received is data information for establishing a user plane for a UE in an LTE access system accessing the RN. The DeNB may transmit the downlink data received to the RN transparently in response to a determination that the downlink data received from the core network and to be sent to the RN corresponds to a wireless access network other than LTE.

Corresponding to the process as shown in FIG. 14, a structure of an RN is provided. As shown in FIG. 15, the RN may include: an RB establishing unit, a database and a data transmitting unit.

The RB establishing unit is configured for receiving an RB establishment request from a DeNB, receives access network information that will be transmitted by each RB, and stores the information in the database. The data transmitting unit is configured for receiving uplink data sent by a UE, sending the uplink data to the DeNB by using an RB for transmitting information of an access network corresponding to the uplink data based on access network information that will be transmitted by each RB stored in the database; receiving downlink data sent by the DeNB, and sending the downlink data to the UE by using an access network corresponding to the RB that received the downlink data based on access network information that will be transmitted by each RB stored in the database.

The above embodiments make fewer modifications to conventional networks and techniques, guarantees service quality provided for a UE accessing an LTE system, and enables an RN to support access of UEs using multiple access techniques.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method by a base station supporting multiple wireless access systems, the method comprising:
   receiving, from a mobility management element (MME), a first message to establish at least two evolved radio access bearers (ERABs);
   transmitting, to a relay node (RN), a second message to establish at least two radio bearers (RBs) corresponding to each of the at least two ERABs; and
   receiving, from the RN, a third message indicting an RB establishment response, and transmitting, to the MME, a fourth message indicating an ERAB establishment response,
   wherein access network information indicating a type of access network corresponding to each bearer is included in at least one of the first message, the second message, or the third message, and the type of access network includes a long term evolution (LTE) access network and a non-LTE access network.

2. The method of claim 1, wherein the first message comprises: an initial context setup request, an ERAB establishment request, or an ERAB modification request.

3. The method of claim 1, wherein the second message comprises an RRC connection re-configuration request.

4. The method of claim 1, further comprising:
receiving, from the RN, data by using an RB for bearing this access network information corresponding to an access technology through which the data is received; and
transmitting, to the MME, the data by using an ERAB corresponding to the RB for transmitting the data.

5. The method of claim 1, wherein the non-LTE access network comprises a 3G access network, a WiFi access network, and another non-LTE access network.

6. A method by a relay node (RN) supporting multiple wireless access systems, the method comprising:
receiving, from a base station, a first message to establish at least two radio bearers (RBs); and
transmitting, to the base station, a second message indicating an RB establishment response,
wherein access network information indicating a type of access network corresponding to each of the at least two RBs is included in at least one of the first message or the second message, and the type of access network includes a long term evolution (LTE) access network and a non-LTE access network.

7. The method of claim 6, wherein the first message comprises an RRC connection re-configuration request.

8. The method of claim 6, further comprising:
receiving, from a terminal, data; and
transmitting, to the base station, the data by using an RB for bearing this access network information corresponding to an access technology by which the data is received.

9. The method of claim 6, wherein the non-LTE access network comprises a 3G access network, a WiFi access network, and another non-LTE access network.

10. A method by a target base station supporting multiple wireless access systems, the method comprising:
receiving, by the target base station, a first message to establish at least two evolved radio access bearers (ERABs) during a handover, from a mobility management element (MME) or a source base station, and
receiving, by the target base station, access network information indicating a type of access network corresponding to each of the at least two ERABs established by the target base station, from the MME or the source base station,
wherein the type of access network includes a long term evolution (LTE) access network and a non-LTE access network.

11. The method of claim 10, when the handover is S1 handover, the first message is a handover request message transmitted by the MME.

12. The method of claim 10, when the handover is X2 handover, the first message is a handover request message transmitted by the source base station.

13. The method of claim 10, wherein the access network information that will be transmitted by each of the at least two ERABs established by the target base station is received from the source base station, the MME, or a relay node (RN).

14. The method of claim 13, further comprising:
receiving, from the RN after the handover, data by using a radio bearer (RB) for bearing the access network information corresponding to an access technology by which the data is received; and
transmitting, to the MME, the data by using an ERAB corresponding to the RB for transmitting the data.

15. The method of claim 10, wherein the non-LTE access network comprises a 3G access network, a WiFi access network, and another non-LTE access network.

16. A method by a relay node (RN) supporting multiple wireless access systems, the method comprising:
receiving, from a base station, a radio bearer (RB) establishment request including access network information indicating a type of access network corresponding to each of at least two RBs;
receiving, from a terminal, uplink data, and transmitting the uplink data to the base station by using an RB for bearing information of an access network corresponding to the uplink data; and
receiving, from the base station, downlink data, and transmitting the downlink data to the terminal by using an access network corresponding to the downlink data,
wherein the type of access network includes a long term evolution (LTE) access network and a non-LTE access network.

17. The method of claim 16, wherein the non-LTE access network comprises a 3G access network, a WiFi access network, and another non-LTE access network.

18. A relay node (RN), comprising:
at least one processor;
a database; and
a transceiver, wherein:
the at least one processor is configured to receive an radio bearer (RB) establishment request from a base station and establish at least two RBs; and receive access network information indicating a type of access network corresponding to each of the at least two RBs in the RB establishment request, and store the access network information in the database;
the transceiver is configured to receive uplink data from a terminal, transmit the uplink data to the base station by using an RB for bearing information of an access network corresponding to the uplink data based on the access network information stored in the database; and receive downlink data from the base station, and transmit the downlink data to the terminal by using an access network corresponding to the downlink data
wherein the type of access network includes a long term evolution (LTE) access network and a non-LTE access network.

19. The RN of claim 18, wherein the non-LTE access network comprises a 3G access network, a WiFi access network, and another non-LTE access network.

* * * * *